United States Patent
Choy

(10) Patent No.: US 8,749,285 B1
(45) Date of Patent: Jun. 10, 2014

(54) DIFFERENTIAL VOLTAGE-MODE BUFFER WITH CURRENT INJECTION

(71) Applicant: Pericom Semiconductor Corporation, San Jose, CA (US)

(72) Inventor: Kwok Wing Choy, San Jose, CA (US)

(73) Assignee: Pericom Semiconductor Corp., Milpitas, CA (US)

( * ) Notice: Subject to any disclaimer, the term of this patent is extended or adjusted under 35 U.S.C. 154(b) by 0 days.

(21) Appl. No.: 13/833,132

(22) Filed: Mar. 15, 2013

(51) Int. Cl.
*H03L 7/00* (2006.01)

(52) U.S. Cl.
USPC .......................... 327/161; 327/536; 327/537

(58) Field of Classification Search
USPC ...................... 327/141, 144–163; 331/15–17; 375/373–376
See application file for complete search history.

(56) References Cited

U.S. PATENT DOCUMENTS

| | | | |
|---|---|---|---|
| 6,690,192 B1* | 2/2004 | Wing | 326/32 |
| 6,882,229 B1* | 4/2005 | Ho et al. | 331/1 A |
| 7,365,582 B1* | 4/2008 | Teo et al. | 327/157 |
| 7,504,892 B1* | 3/2009 | Pesucci et al. | 331/16 |
| 2005/0168291 A1* | 8/2005 | Karlsson | 331/16 |
| 2007/0001723 A1* | 1/2007 | Lin | 327/156 |
| 2008/0054963 A1* | 3/2008 | Masenas | 327/157 |
| 2009/0257319 A1* | 10/2009 | Henzler | 368/113 |

OTHER PUBLICATIONS

Video Electronics Standards Association (VESA) ,"VESA DisplayPort Standard, Version 1, Revision 2", www.vesa.org, (Jan. 2010), 83 pages.
Morriss, Jeff, "PCI Express® 3.0 Electrical", *PCIe Technical Seminar* (PCI SIG copyright 2011), 70 pages.

* cited by examiner

*Primary Examiner* — Brandon S Cole
(74) *Attorney, Agent, or Firm* — Weaver Austin Villeneuve & Sampson LLP

(57) ABSTRACT

Differential buffers are described that combine aspects of voltage-mode buffers with current injection to achieve the tunability associated with current-mode buffers as well as the low current and low power associated with voltage-mode buffers.

20 Claims, 6 Drawing Sheets

| Pre-emphasis Setting | | Normalized Tap Coefficients | | |
|---|---|---|---|---|
| Pre-emphasis Main Cursor Level | Pre-emphasis Post-Cursor2 Level | Main Cursor C0 | Post-Cursor1 C1 | Post-Cursor2 C2 |
| 0 | 0 | 1 | 0 | 0 |
| 0 | 1 | 0.95 | 0 | 0.05 |
| 0 | 2 | 0.90 | 0 | 0.10 |
| 0 | 3 | 0.85 | 0 | 0.15 |
| 1 | 0 | 0.835 | -0.165 | 0 |
| 1 | 1 | 0.785 | -0.165 | 0.05 |
| 1 | 2 | 0.735 | -0.165 | 0.10 |
| 1 | 3 | 0.685 | -0.165 | 0.15 |
| 2 | 0 | 0.75 | -0.25 | 0 |
| 2 | 1 | 0.7 | -0.25 | 0.05 |
| 2 | 2 | 0.65 | -0.25 | 0.10 |
| 2 | 3 | 0.60 | -0.25 | 0.15 |
| 3 | 0 | 0.67 | -0.33 | 0 |
| 3 | 1 | 0.62 | -0.33 | 0.05 |
| 3 | 2 | 0.57 | -0.33 | 0.10 |
| 3 | 3 | 0.52 | -0.33 | 0.15 |

Table 1: Post-Cursor Tap Coefficients

DIFFERENTIAL VOLTAGE-MODE BUFFER WITH CURRENT INJECTION

BACKGROUND

The DisplayPort standards published by the Video Electronics Standards Association (VESA) describe digital display interfaces used to connect video sources, e.g., graphics processing units (GPUs), to display devices, e.g., computer monitors. DisplayPort interfaces include 1 to 4 lanes over which high-speed, packetized data are transmitted (e.g., 1.62, 2.7, or 5.4 Gigabits per second per lane).

One advantage of DisplayPort over previous display interface standards is that it includes link training that enables the transmitter in the source to adapt to different cable lengths. That is, because of the signal degradation that occurs as the transmitted data propagate over the cable, a training sequence determines an appropriate level of "preemphasis" to apply to the higher frequency components of the data signal at the output buffer(s) of the transmitter to ensure that a sufficient signal level reaches the receiver at the other end of the cable.

Conventional high-speed transmitters in DisplayPort-compliant display interfaces employ either pure current-mode buffers or pure voltage-mode buffers as output buffers to apply the necessary levels of preemphasis. Conventional current-mode buffers are effective in high-speed transmitters but can consume an undesirably high amount of current for some applications. Conventional voltage-mode buffers are also effective and consume significantly less current than their current-mode counterparts. However, there is a design tradeoff with voltage-mode buffers between tunability and complexity. That is, in order to achieve a level of tunability comparable to current-mode buffers (i.e., to achieve the desired levels of preemphasis for different conditions) the complexity of the output buffer design may become unacceptably high.

SUMMARY

According to one class of implementations, a differential buffer is provided that includes delay circuitry configured to generate one or more pairs of complementary signals from a serial data stream and first circuitry configured to generate a first end of a differential output signal. The first circuitry includes first voltage-mode circuitry that is configurable using a first subset of the complementary signals to provide a first plurality of signal levels to a first subset of data pulses derived from the serial data stream. The first circuitry also includes first current-mode circuitry including one or more first current sources that are configurable using a second subset of the complementary signals to inject current to or remove current from the first end of the differential output signal to provide a second plurality of signal levels to a second subset of the data pulses.

According to another class of implementations, a buffer is provided that includes delay circuitry configured to generate one or more control signals from a serial data stream. The buffer also includes voltage-mode circuitry that is configurable using a first subset of the control signals to provide a first plurality of signal levels of an output signal of the buffer to a first subset of data pulses derived from the serial data stream. The buffer also includes current-mode circuitry comprising one or more current sources that are configurable using a second subset of the control signals to inject current to or remove current from the output signal to provide a second plurality of signal levels at the output signal to a second subset of the data pulses.

According to another class of implementations, a method is provided for generating a differential signal corresponding to a serial data stream. One or more pairs of complementary signals are generated from the serial data stream. A first end of the differential signal is generated by configuring voltage-mode circuitry using a first subset of the complementary signals to provide a first plurality of signal levels to a first subset of data pulses derived from the serial data stream. One or more first current sources are configured using a second subset of the complementary signals to inject current to or remove current from the first end of the differential output signal to provide a second plurality of signal levels to a second subset of the data pulses.

According to various implementations, the voltage-mode circuitry may be implemented with a configurable voltage divider. According to other implementations, the voltage-mode circuitry may be implemented using other voltage leveling designs, including but not limited, to one or more digital-to-analog converters (DACs), amplifiers, and/or other voltage sources.

A further understanding of the nature and advantages of the present invention may be realized by reference to the remaining portions of the specification and the drawings.

DETAILED DESCRIPTION

According to various implementations, differential buffers are described that combine aspects of voltage-mode buffers with current injection to achieve the tunability associated with current-mode buffers as well as the low current and low power associated with voltage-mode buffers.

A particular class of implementations will now be described for use in a transmitter circuit that is compliant with the VESA DisplayPort Standard, Version 1, Revision 2 adopted Dec. 22, 2009, the entirety of which is incorporated herein by reference for all purposes. However, it will be understood that the described implementations may be readily modified for application to any version or revision of the DisplayPort standard. Moreover, implementations are contemplated that may be employed in other contexts. For example, implementations are contemplated that are compliant with the High-Definition Multimedia Interface (HDMI) standard, the Serial ATA standard, the Peripheral Component Interconnect Express (PCI-E) standard, and the USB standard. And more generally, those of skill in the art will understand the implementations as described herein may be implemented in virtually any high-speed signal application. The full scope of protection to which the applicant is entitled should therefore not be limited with references to the specific examples described herein.

The DisplayPort Standard Version 1.2 (hereinafter also referred to as DisplayPort) specifies four different levels of preemphasis that may be applied to each "main cursor" pulse in the data signal, i.e., each data bit pulse which represents a logic level transition relative to the immediately preceding pulse. DisplayPort also specifies corresponding levels of emphasis or deemphasis for the data bit pulses immediately following the main cursor pulse (i.e., the post-cursor pulse), as well as the pulse after that (i.e., the post-cursor2 pulse), but only if these data bit pulses remain at the same logic level as the main cursor pulse. If a transition occurs, that data bit pulse is, by definition, a main cursor pulse and will have the appropriate level of preemphasis applied. This may be understood with reference to FIG. 1.

Figure 1:
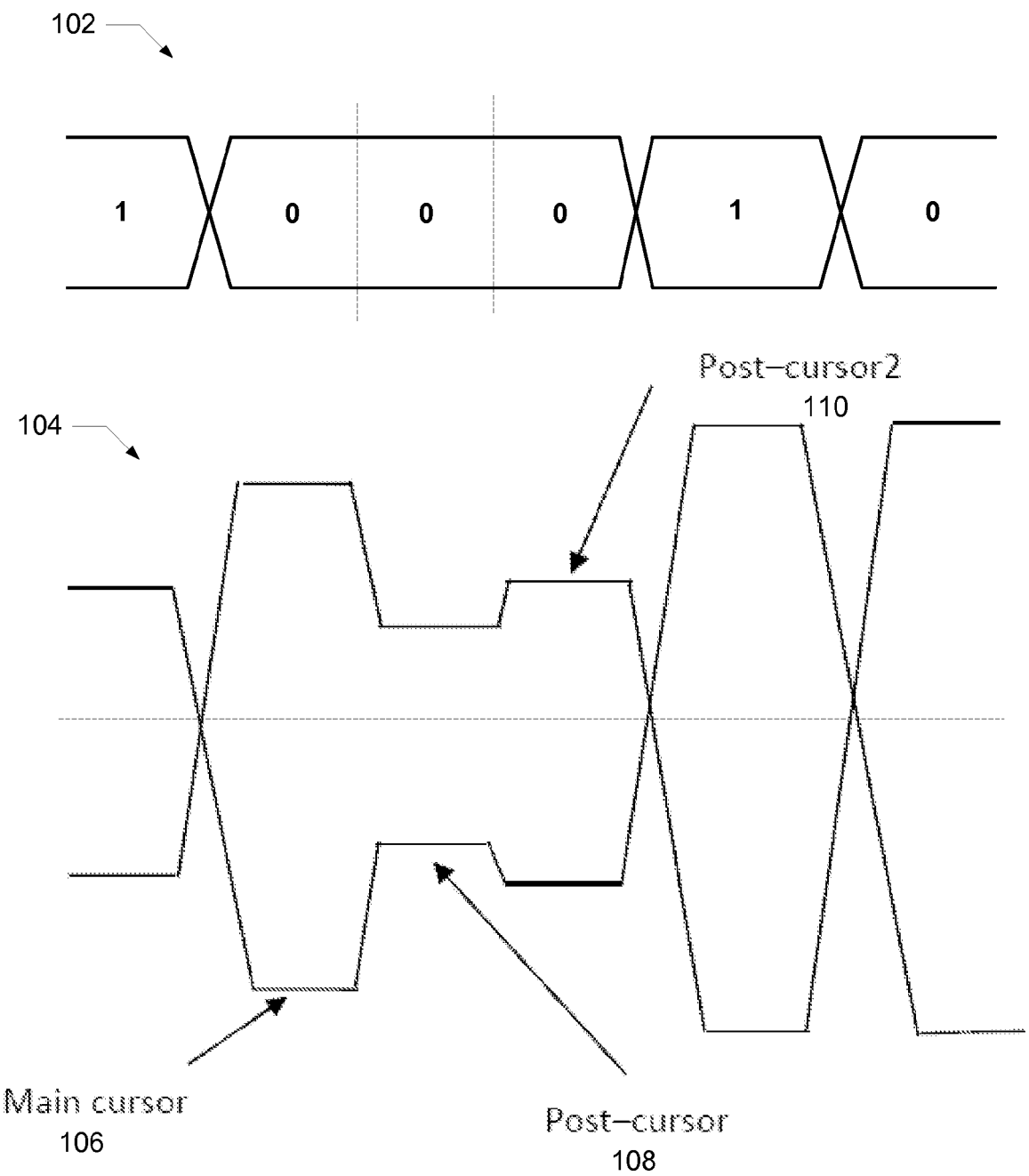
FIG. 1 illustrates signal level adjustment to a data signal that may be achieved with differential buffers as described herein.

FIG. 1 shows a differential data signal 102 in which the sequence of bit pulses represents a sequence "100010." Signal 104 is a DisplayPort-compliant signal corresponding to data signal 102 after application of the level adjustments to the sequence of pulses corresponding to the three consecutive "0" bits, resulting in main cursor pulse 106, post-cursor pulse 108, and post-cursor2 pulse 110. As shown, a strong emphasis is placed on main cursor pulse 106, with post-cursor pulse 108 being significantly deemphasized relative to main cursor pulse 106, followed by post-cursor2 pulse 110 being emphasized relative to post-cursor pulse 108. Any pulses subsequent to a post-cursor2 pulse that represent the same logic level are maintained at the level of the post-cursor2 pulse as a preemphasis is not required for these lower-frequency segments of the data signal. On the other hand, if there is a transition following the post-cursor2 pulse (e.g., from "0" to "1" as shown in FIG. 1), a preemphasis is applied to this higher-frequency segment of the data signal.

The relative signal levels for the main cursor, post-cursor and post-cursor2 pulses are specified by version 1.2 of the DisplayPort standard for 16 allowable combinations of preemphasis for the main cursor and post-cursor2 pulses (i.e., 4 levels for each of the two pulses). The relationship among these levels may be understood with reference to the diagram of FIG. 2 which is a mathematical abstraction of this relationship. In this representation, an input data signal (e.g., data signal 102) is delayed twice (by 1-bit delay elements 202). A multiplier is applied to each signal (coefficients C0, C1 and C2, respectively) to generate signals representing the main cursor, the post-cursor and the post-cursor2. These coefficients represent the relative signal levels for the respective bit pulses. The resulting signals are summed. As shown and as specified by the standard, the sum is constrained to be 1. C0, C1 and C2 are therefore referred to as the "normalized tap coefficients."

Figure 2:
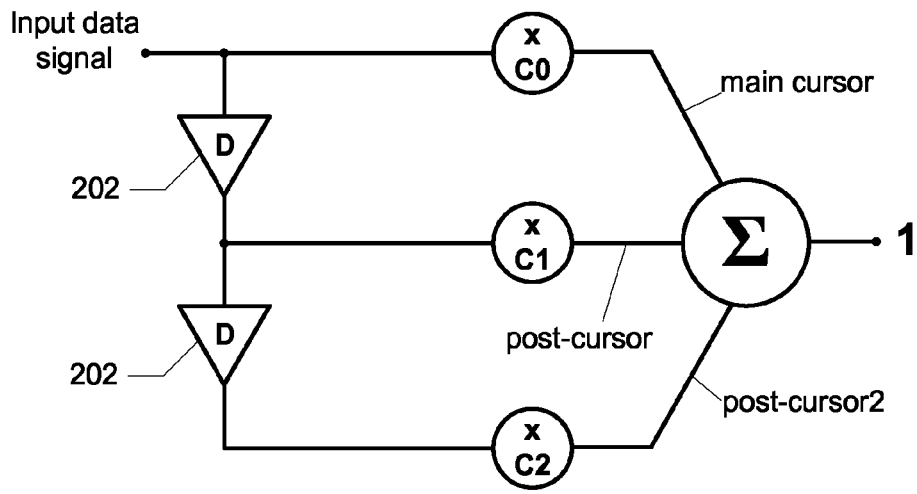
FIG. 2 illustrates relationships among main cursor, post-cursor and post-cursor2 pulses according to the DisplayPort standard.

FIG. 2 also includes a table of tap coefficients (Table 1) from the DisplayPort standard that specifies four valid preemphasis settings each for the main cursor and the post-cursor2. Level 0 in the table represents 0 dB, level 1 represents 3.5 dB, level 2 represents 6 dB and level 3 represents 9.5 dB.

Figure 3:
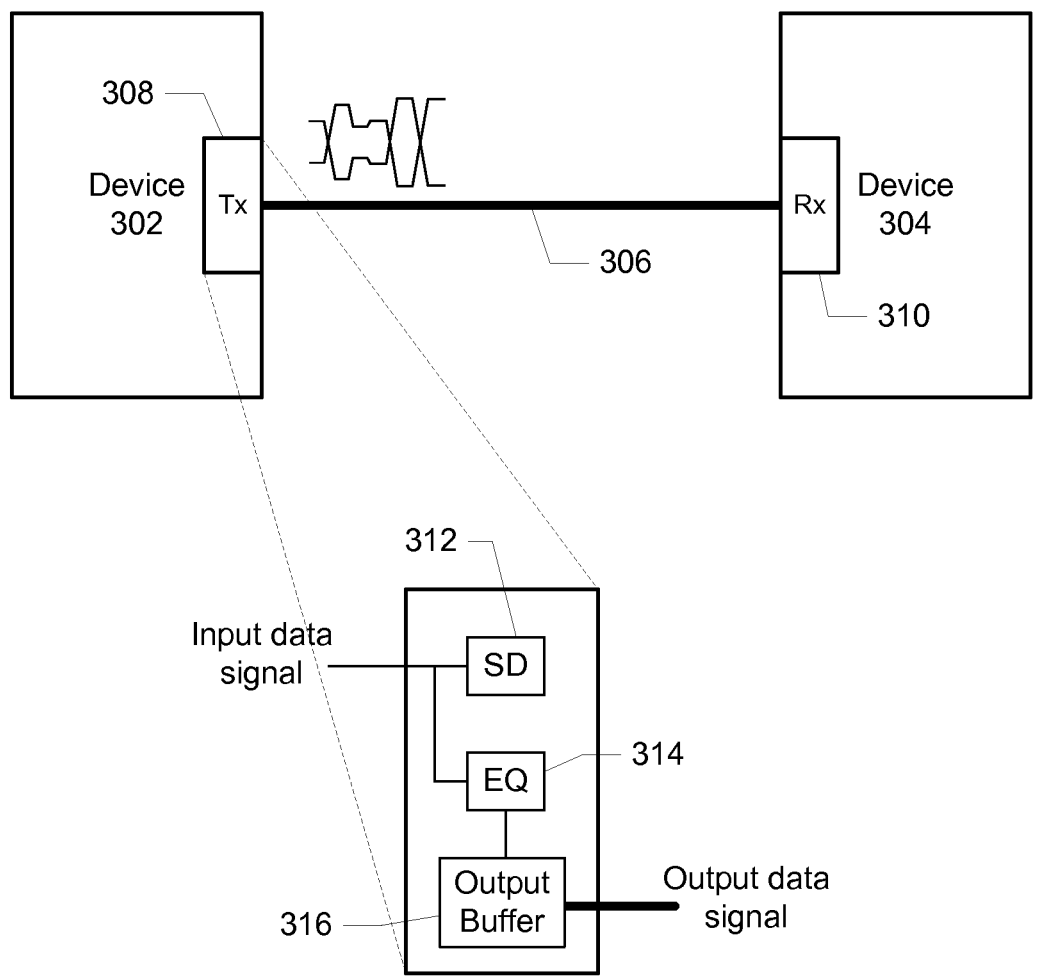
FIG. 3 is a simplified block diagram of a high-speed serial interface.

FIG. 3 is a simplified illustration of an implementation including a buffer implemented as described herein. Device 302 (e.g., a computing device, a laptop docking station, etc.) is connected to device 304 (e.g., a display monitor) via a data transmission link 306 (e.g., a digital video cable). Transmitter 308 in device 302 transmits high-speed data to receiver 310 in device 304. Transmitter 308 includes a signal detector 312 to determine when a valid input data signal is present and an equalizer 314 to adjust the level of the input data signal to the appropriate range for the application of any preemphasis by output buffer 316 which transmits the output data signal over link 306 to receiver 310.

Figure 4:
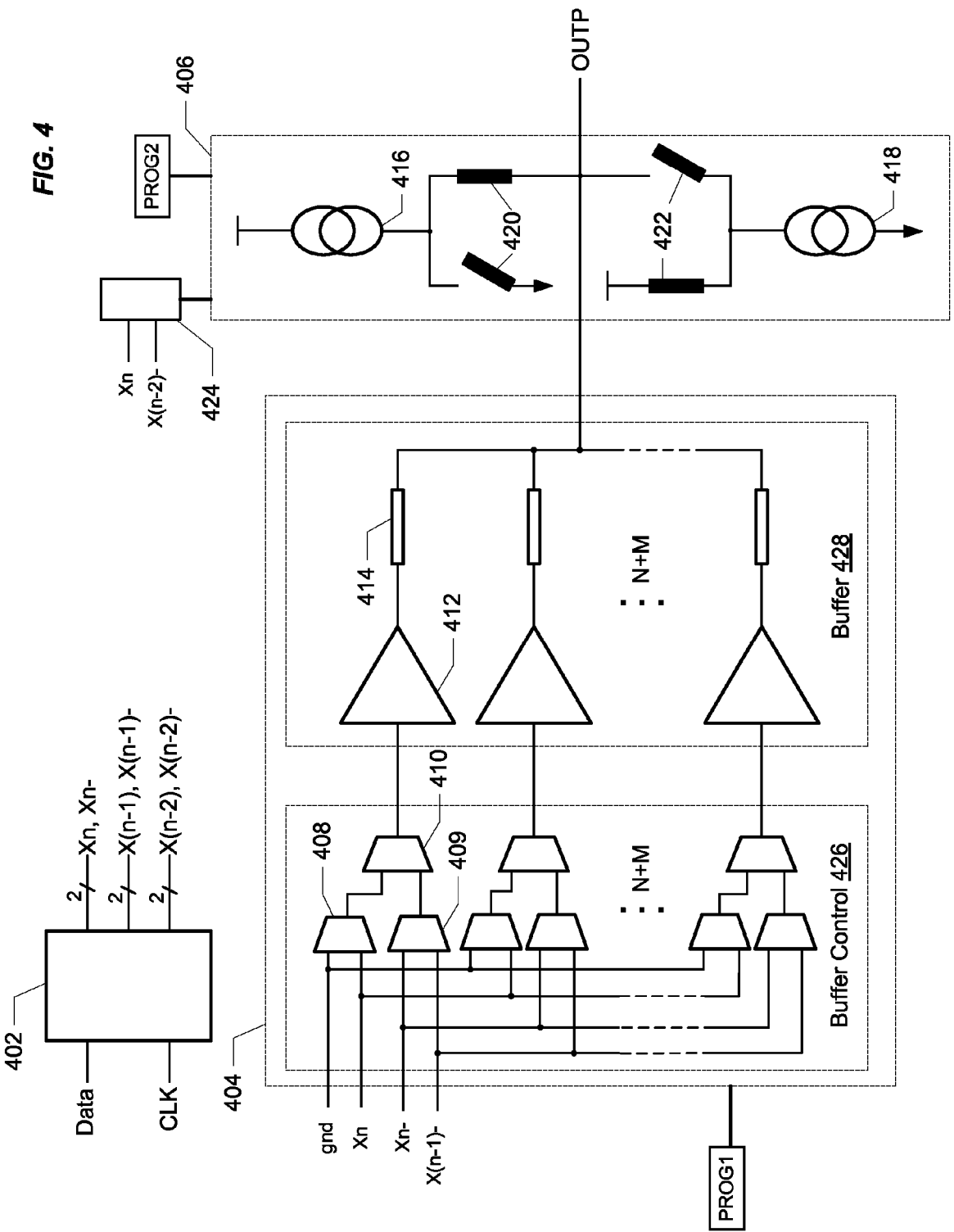
FIG. 4 is a simplified schematic of a particular implementation of a differential buffer.

A particular implementation of an output buffer 400 which may be used, for example, to implement output buffer 316 of FIG. 3, will now be described with reference to FIG. 4. Output buffer 400 uses a combination of voltage-mode and current-mode control to provide a high degree of tunability to achieve the required drive levels for the main cursor, post-cursor and post-cursor2 pulses as specified by version 1.2 of the DisplayPort standard. It should be noted that the circuitry of FIG. 4 is shown generating one end of the transmitter's differential data signal (OUTP). The other end of the differential signal (OUTN) may be generated by similar circuitry with the depicted polarities reversed. Alternatively, one end of the differential signal (OUTP or OUTN) may be generated by a complementary signal generator using the other end of the differential signal as input. It should also be noted that the basic design embodied by output buffer 400 may be configured to implement a wide variety of high-speed interfaces.

A delay circuit 402 generates three pairs of complementary outputs from the data signal and a clock signal. One pair of outputs (Xn, Xn−) represents the current data bit, another (X(n−1), X(n−1)−) represents the bit immediately previous to the current data bit, and the third (X(n−2), X(n−2)−) represents the bit two bits previous to the current data bit. As will be understood, under certain conditions, these signals will represent the post-cursor2, post-cursor and main cursor pulses. It should also be noted that the outputs of delay circuit 402 may be used by the circuitry that generates both ends of the transmitter's differential output signal (OUTP and OUTN). The remainder of FIG. 4 depicts the circuitry for only one end of the differential output signal (OUTP).

Voltage-mode preemphasis circuitry 404 provides the primary preemphasis drive for the transmitter with current injection or removal provided by post-cursor2 circuitry 406 under certain conditions to achieve the required relationship among the main cursor, post-cursor and post-cursor2 pulse signal levels. Such circuitry may be a single-ended circuit or a differential circuit.

Voltage-mode circuitry 404 includes a number of signal paths (N+M), each of which includes three 2-to-1 multiplexers (408, 409 and 410), a driver 412, and a series resistor 414 as shown. The control for multiplexers 408, 409 and 410 (represented by programming input PROG1) selects the input for each driver 412 to be one of the four available inputs gnd, Xn, Xn−, or X(n−1)−. The gnd input may be selected to provide a power down function. The inputs to corresponding circuitry generating the other end of the transmitter's differential signal (OUTN) would be the complements of these signals.

Depending on the control, some number N of the drivers are driven high, while some number M of the drivers are driven low, i.e., the control of the multiplexers determines the ratio of N:M. This, in turn, determines the output swing of OUTP. That is, voltage-mode circuitry 404 implements a configurable voltage divider in which N parallel resistances are pulled up to the positive supply (not shown) and M parallel resistances are pulled down to the negative supply (not shown). These resistances include series resistor 414 and the output impedance of driver 412 for each signal path. The ratio N:M may be manipulated to achieve a desired signal level swing, and therefore the appropriate level of preemphasis for a given signal condition. And because the sum N+M is constant, this ensures a substantially constant output impedance for the transmitter for transmission line impedance matching. A similar voltage mode pre-emphasis circuit can be modified to generate complementary signals.

According to a particular implementation, the number of signal paths is 10 with the resistances associated with each path being 500 ohms, providing for a range of voltage divider ratios from about 0.01 to about 0.5, and a substantially constant output impedance of 50 ohms. Control logic (e.g., PROG1) decodes two control bits representing four swing settings and two control bits representing four preemphasis settings to provide the control for the multiplexers of voltage-mode circuitry 404. Table 2 below shows the input connections for each driver (e.g., drivers 412) for different swing and preemphasis settings.

TABLE 2

| | 0 dB | | | 3.5 dB | | 6 dB |
|---|---|---|---|---|---|---|
| Driver | 400 mV | 600 mV | 800 mV | 400 mV | 600 mV | 400 mV |
| 1 | Xn | Xn | Xn | Xn | Xn | Xn |
| 2 | Xn | Xn | Xn | Xn | Xn | Xn |
| 3 | Xn | Xn | Xn | Xn | Xn | Xn |
| 4 | Xn | Xn | Xn | Xn | Xn | Xn |
| 5 | Xn | Xn | Xn | Xn | Xn | Xn |
| 6 | Xn | Xn | Xn | Xn | Xn | Xn |
| 7 | Xn | Xn | Xn | Xn | Xn | Xn |
| 8 | Xn− | Xn | Xn | X(n−1)− | Xn | X(n−1)− |
| 9 | Xn− | Xn− | Xn | Xn− | X(n−1)− | X(n−1)− |
| 10 | Xn− | Xn− | Xn− | Xn− | X(n−1)− | Xn− |

Post-cursor2 circuitry 406 includes a current injection current source 416 and a current removal current source 418 which may be selectively connected to the transmitter output (OUTP) via differential switches 420 and 422 to inject or remove current under certain conditions, e.g., when a post-cursor2 pulse is present, to achieve the desired signal levels. Such circuitry may be a single-ended circuit or a differential circuit. The other side of differential switch 420 is connected to a current sink (e.g., ground), while the other side of differential switch 422 is connected to a current supply (e.g., a voltage supply). Thus, the current for each current source has a current path when not connected to the transmitter output. As will be understood, because the AC impedances associated with current sources are high, and because the output impedance of voltage-mode circuitry 404 is relatively low by comparison, the presence of post-cursor2 circuitry 406 may have a relatively small and possibly negligible effect on the output impedance of the transmitter. According to some implementations, the amount of current delivered by each of current sources 416 and 418 is controlled by control logic (e.g., PROG2) which decodes two control bits to provide four different levels corresponding to the DisplayPort standard.

In the depicted implementation, decoder logic 424 associated with post-cursor2 circuitry 406 receives inputs X(n−2)− and Xn. Corresponding circuitry generating the other end of the differential signal (OUTN) can be used to receive the complements of these signals. Differential switch 420 (e.g., a PMOS switch) is shown as closed, and differential switch 422 (e.g., an NMOS switch) is shown as open, in which configuration, current source 416 is injecting current to OUTP. Valid operation also includes configurations in which switch 420 is open and switch 422 is closed (and current source 418 is removing current from OUTP), and in which both switches are open when there is no current injected or removed (i.e., off mode). A similar circuit injects current to and removes current from OUTN. Decoder logic 424 detects bit patterns represented by inputs X(n−2)− and Xn and controls switches 420 and 422 accordingly.

Figure 6A:
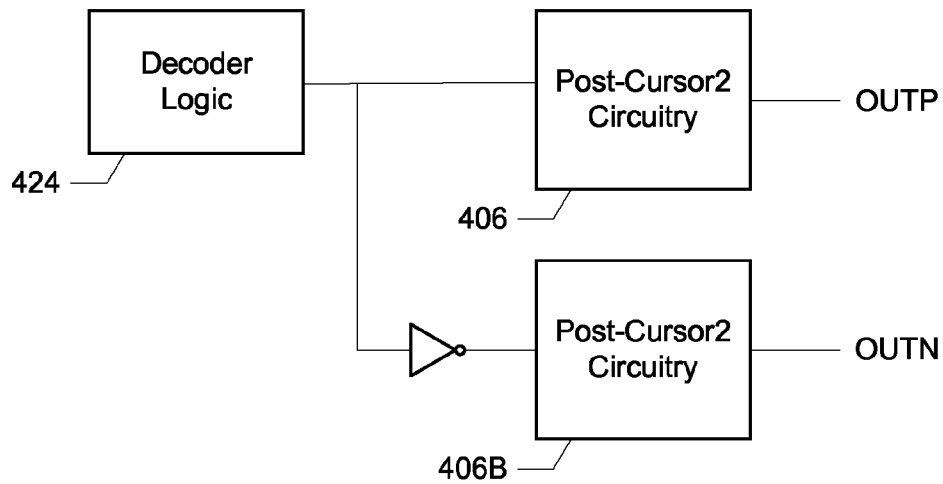
FIGS. 6A-6C illustrate various alternative configurations of the circuitry of FIG. 4 to generate a differential signal.
Figure 6B:
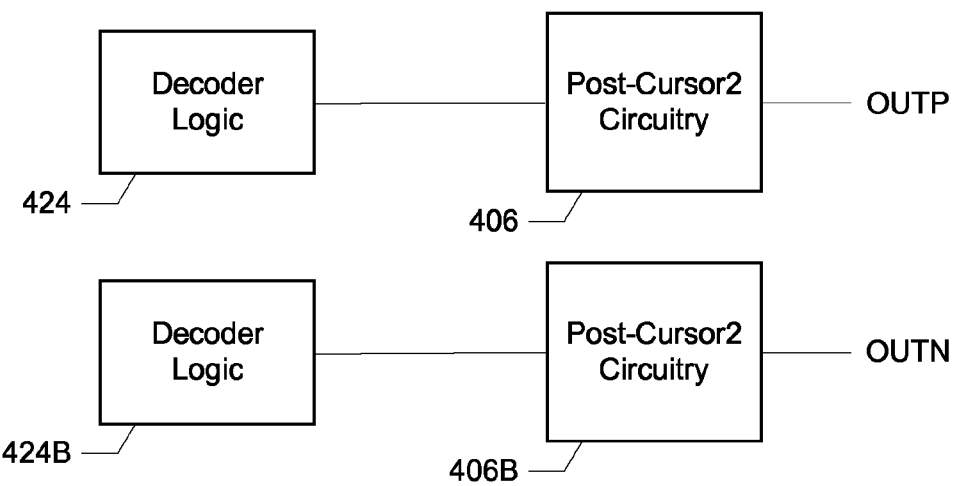

As shown in FIGS. 6A and 6B, the decoder logic associated with the current injection/removal circuitry (e.g., post-cursor2 circuitry 406 of FIG. 4) can be used to drive one or multiple instances of the current injection/removal circuitry. For example, a single block of decoder logic 424 may drive post-cursor2 circuitry 406 (corresponding to OUTP) and post-cursor2 circuitry 406B (corresponding to OUTN) as shown in FIG. 6A. Alternatively, each post-cursor2 circuit (e.g., 406 and 406B) may have its own decoder logic (e.g., 424 and 424B) as shown in FIG. 6B. Other variations will be apparent to those of skill in the art.

According to a particular implementation, current source 418 removes current (i.e., switch 422 is closed) when Xn=1 and X(n−2)=0. Current source 416 injects current (i.e., switch 420 is closed) when Xn=0 and X(n−2)=1. Both switches are open for all other bit sequences. As will be understood, the number of inputs and the logic controlling the switches may be varied to suit particular applications.

Various combinations of voltage-mode and current injection/removal to achieve signal level adjustment as described herein may be implemented to suit a wide variety of implementations. That is, for example, the logic and control of the various circuit components described herein may be modified to apply preemphasis and/or inject or remove current for any given bit sequence as would be appropriate for a particular application. Moreover, the magnitudes of current and voltage levels and the number of programmable levels of each may be modified to suit particular applications. For example, implementations are contemplated in which the voltage-mode circuitry and current injection/removal circuitry are configured only to apply preemphasis (e.g., with a high degree of tunability). Other implementations are contemplated in which a differential buffer may be programmed to apply different preemphasis regimes for different applications. Other applications for which various contemplated implementations may be suited include a variety of high-speed serial interfaces such as, for example, interfaces that comply with the HDMI, Serial ATA, PCI-E or USB standards. Other suitable applications and variations will be apparent to those of skill in the art.

Figure 5:
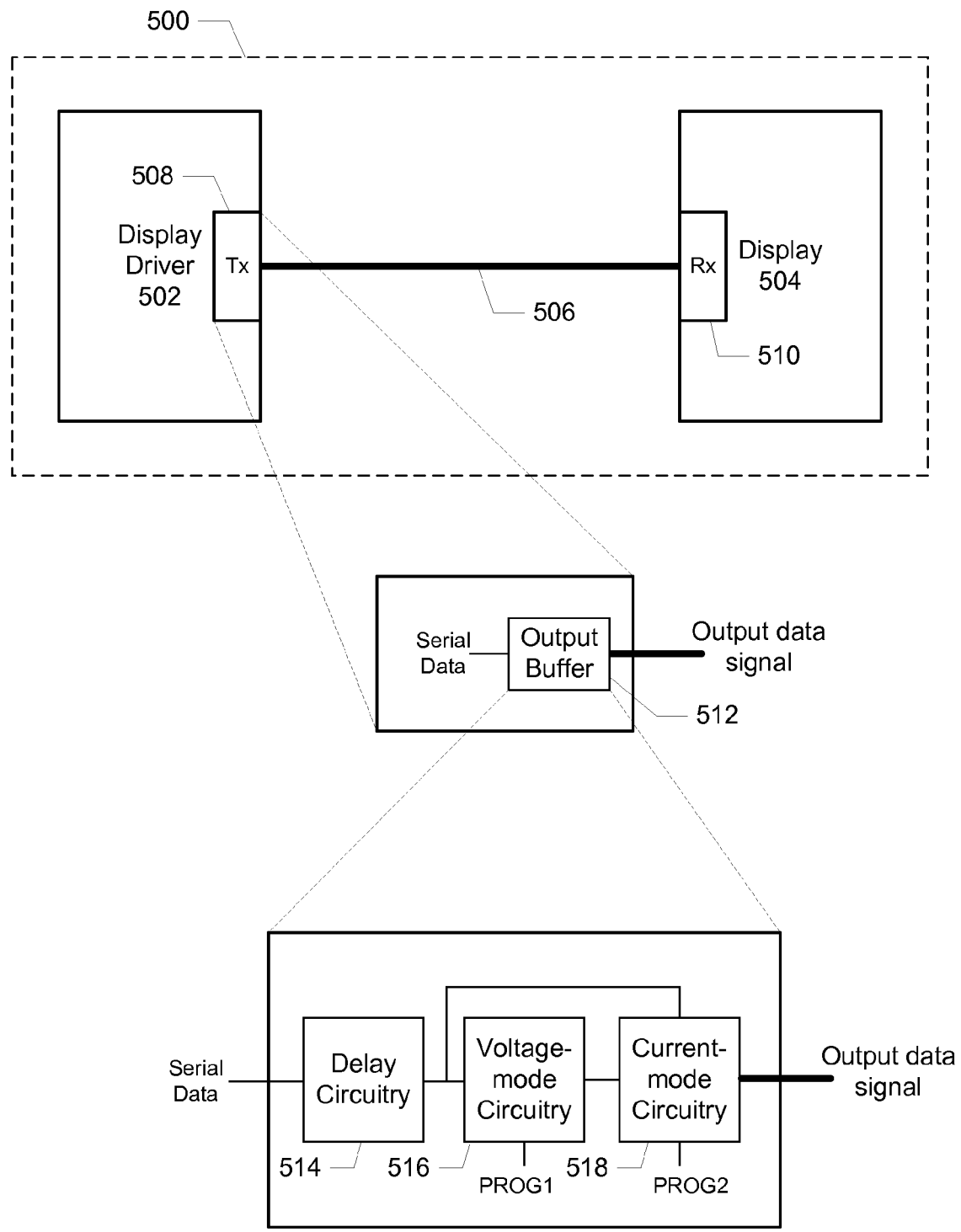
FIG. 5 is a simplified illustration of another implementation including a buffer implemented as described herein.

FIG. 5 is a simplified illustration of another implementation including a buffer implemented as described herein. Device 500 (e.g., a computing device, a mobile device, a television, a tablet, a gaming console, video equipment (including video processing equipment and professional video applications), medical equipment, docking station, vehicle onboard display, security and surveillance equipment, set top boxes, smart phones, and any other type of device that can interface with displays) includes a display driver 502 connected to a display 504 via a data transmission link 506. It should be noted that display 504 may be integrated with or separate from device 500. Transmitter 508 in display driver 502 transmits high-speed serial data to receiver 510 in display 504. Transmitter 508 includes one or more output buffers 512 which transmit the output data signal over link 506 to receiver 510 with various signal levels and/or preemphasis. Delay circuitry 514 in output buffer 512 generates one or more control signals from the serial data stream. Voltage-mode circuitry 516 includes a voltage divider (not shown) that is configurable (e.g., by PROG1 input), and is responsive to the control signals from delay circuitry 514 to apply various signal levels and/or preemphasis to the data pulses of the output signal. Current-mode circuitry 518 includes one or more current sources (not shown) that are configurable (e.g., by PROG2 input), and is responsive to the control signals to inject current to or remove current from the output signal to further adjust the signal levels and/or preemphasis of the data pulses of the output signal.

Various implementations described herein may be implemented using any of a variety of standard or proprietary CMOS processes. In addition, it should be noted that implementations are contemplated that may employ a much wider range of semiconductor materials and manufacturing processes including, for example, GaAs, SiGe, etc. Differential buffers as described herein may be represented (without limitation) in software (object code or machine code in non-transitory computer-readable media), in varying stages of compilation, as one or more netlists (e.g., a SPICE netlist), in a simulation language, in a hardware description language (e.g., Verilog, VHDL), by a set of semiconductor processing masks, and as partially or completely realized semiconductor devices (e.g., an ASIC). Some implementations may be a standalone integrated circuit, while others may be embedded as part of larger system on a chip.

While the subject matter of this application has been particularly shown and described with reference to specific implementations thereof, it will be understood by those skilled in the art that changes in the form and details of the disclosed implementations may be made without departing from the spirit or scope of the invention. For example, references to "post-cursor" pulses as described in the DisplayPort standards should not be used to unduly limit the scope of the invention. Rather, it should be understood with reference to that terminology that emphasis may be placed on any pulse in a sequence of pulses that include the equivalent of a "main cursor" pulse. In one example in which an interface is compliant with the PCI-E standard, emphasis may be placed on a "pre-cursor" pulse. Other variations will be apparent to those of skill in the art.

Figure 6C:
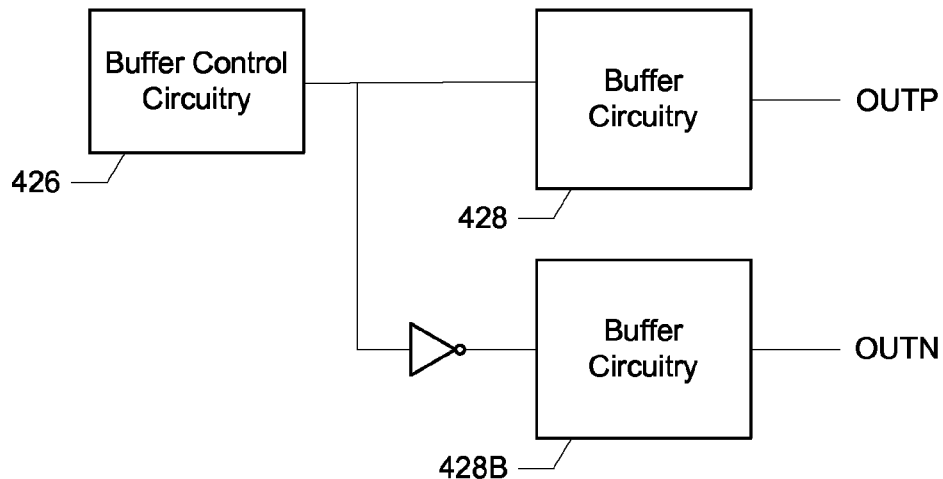

In another example, various portions of the voltage-mode and current injection/removal circuitry may be reused or duplicated (with appropriate signal inversion) without departing from the scope of the invention. Some representative examples relating to current injection/removal circuitry are described above with reference to FIGS. 6A and 6B. A further example relates to voltage-mode circuitry (e.g., circuitry 404 of FIG. 4). As shown in FIG. 4, voltage-mode circuitry 404 may be functionally divided into buffer control circuitry 426 and buffer circuitry 428. As will be understood, both of these blocks may be reproduced for OUTP and OUTN. However, as shown in FIG. 6C the same buffer control circuitry (e.g., circuitry 426) may be employed to drive multiple instances of buffer circuitry (e.g., circuitry 428 and 428B corresponding to OUTP and OUTN, respectively). Other variations will be apparent to those of skill in the art.

Examples of some implementations are illustrated in the accompanying drawings, and specific details are set forth in order to provide a thorough understanding thereof. It should be noted that implementations may be practiced without some or all of these specific details. In addition, well known features may not have been described in detail to promote clarity.

Finally, although various advantages have been discussed herein with reference to various implementations, it will be understood that the scope of the invention should not be limited by reference to such advantages. Rather, the scope of the invention should be determined with reference to the appended claims.

What is claimed is:

1. A differential buffer, comprising:
   delay circuitry configured to generate one or more pairs of complementary signals from a serial data stream;
   first circuitry configured to generate a first end of a differential output signal, the first circuitry including:
   first voltage-mode circuitry that is configurable using a first subset of the complementary signals to provide a first plurality of signal levels to a first subset of data pulses derived from the serial data stream; and
   first current-mode circuitry comprising one or more first current sources that are configurable using a second subset of the complementary signals to inject current to or remove current from the first end of the differential output signal to provide a second plurality of signal levels to a second subset of the data pulses.

2. The differential buffer of claim 1, further comprising second circuitry configured to generate a second end of the differential output signal, the second circuitry including:
   second voltage-mode circuitry that is configurable using a third subset of the complementary signals to provide a third plurality of signal levels to a third subset of the data pulses corresponding to the first subset of data pulses; and
   second current-mode circuitry comprising one or more second current sources that are configurable using a fourth subset of the complementary signals to inject current to or remove current from the second end of the differential output signal to provide a fourth plurality of signal levels to a fourth subset of the data pulses corresponding to the second subset of the data pulses.

3. The differential buffer of claim 2, wherein the consecutive bits in the serial data stream correspond to a main cursor pulse, a post-cursor pulse, and a post-cursor2 pulse as specified by the DisplayPort standard.

4. The differential buffer of claim 1, wherein the pairs of complementary signals correspond to consecutive data bits in the serial data stream.

5. The differential buffer of claim 1, wherein the first voltage-mode circuitry comprises:
   a first plurality of drivers;
   a first plurality of series resistors each in series with an output of a corresponding one of the first plurality of drivers; and
   first selection circuitry for selecting inputs for each of the first plurality of drivers from among the first subset of the complementary signals, thereby driving the outputs of a first subset of the first plurality of drivers high and the outputs of a second subset of the first plurality of drivers low, thereby configuring the first voltage divider.

6. The differential buffer of claim 1, wherein the first current-mode circuitry comprises a first current-injecting current source, a first current-removing current source, and first selection circuitry for selectively connecting the first current-injecting current source and the first current-removing current source to the first end of the differential output signal.

7. The differential buffer of claim 1, further comprising a complementary signal generator configured to generate a second end of the differential output signal using input from the first circuitry.

8. A transmitter circuit including the differential buffer of claim 1 as an output buffer, the transmitter being configured to transmit the differential output signal according to a serial interface standard.

9. The transmitter circuit of claim 8 wherein the serial interface standard is selected from the group including the DisplayPort standards, the HDMI standards, the Serial ATA standards, the PCI-E standards, or the USB standards.

10. A buffer, comprising:
    delay circuitry configured to generate one or more control signals from a serial data stream;
    voltage-mode circuitry that is configurable using a first subset of the control signals to provide a first plurality of signal levels of an output signal of the buffer to a first subset of data pulses derived from the serial data stream; and current-mode circuitry comprising one or more current sources that are configurable using a second subset of the control signals to inject current to or remove current from the output signal to provide a second plurality of signal levels at the output signal to a second subset of the data pulses.

11. The buffer of claim 10, wherein the output signal of the buffer is a differential signal.

12. The buffer of claim 10, wherein the control signals correspond to consecutive data bits in the serial data stream.

13. The buffer of claim 12, wherein the consecutive bits in the serial data stream correspond to a main cursor pulse, a post-cursor pulse, and a post-cursor2 pulse as specified by the DisplayPort standard.

14. A transmitter circuit including the buffer of claim 10, the transmitter being configured to transmit the output signal according to a serial interface standard.

15. The transmitter circuit of claim 14 wherein the serial interface standard is selected from the group including the DisplayPort standards, the HDMI standards, the Serial ATA standards, the PCI-E standards, or the USB standards.

16. A method for generating a differential signal corresponding to a serial data stream, comprising:
generating one or more pairs of complementary signals from the serial data stream;
generate a first end of the differential signal by configuring first voltage-mode circuitry using a first subset of the complementary signals to provide a first plurality of signal levels to a first subset of data pulses derived from the serial data stream; and
configuring one or more first current sources using a second subset of the complementary signals to inject current to or remove current from the first end of the differential output signal to provide a second plurality of signal levels to a second subset of the data pulses.

17. The method of claim 16, wherein the pairs of complementary signals correspond to consecutive data bits in the serial data stream.

18. The method of claim 17, wherein the consecutive bits in the serial data stream correspond to a main cursor pulse, a post-cursor pulse, and a post-cursor2 pulse as specified by the DisplayPort standard.

19. The method of claim 16, further comprising:
generating a second end of the differential by configuring second voltage-mode circuitry using a third subset of the complementary signals to provide a third plurality of signal levels to a third subset of the data pulses corresponding to the first subset of data pulses; and
configuring one or more second current sources using a fourth subset of the complementary signals to inject current to or remove current from the second end of the differential output signal to provide a fourth plurality of signal levels to a fourth subset of the data pulses corresponding to the second subset of the data pulses.

20. The method of claim 16, further comprising generating a second end of the differential output signal using a complementary signal generator using input from circuitry generating the first end of the differential output signal.

* * * * *